(12) United States Patent
Winckler

(10) Patent No.: US 7,125,034 B2
(45) Date of Patent: Oct. 24, 2006

(54) TOWING HITCH ASSEMBLY

(76) Inventor: Elmer Winckler, 43092 Stone Church Rd., Menno, SD (US) 57045

( * ) Notice: Subject to any disclaimer, the term of this patent is extended or adjusted under 35 U.S.C. 154(b) by 0 days.

(21) Appl. No.: 10/677,188

(22) Filed: Oct. 1, 2003

(65) Prior Publication Data

US 2004/0169348 A1    Sep. 2, 2004

Related U.S. Application Data

(60) Provisional application No. 60/415,960, filed on Oct. 2, 2002, provisional application No. 60/415,426, filed on Oct. 1, 2002.

(51) Int. Cl.
*B62D 53/06*    (2006.01)
(52) U.S. Cl. .................... 280/438.1; 280/441
(58) Field of Classification Search ............ 280/441.1, 280/433, 434, 438.1, 439, 4, 441
See application file for complete search history.

(56) References Cited

U.S. PATENT DOCUMENTS 2,809,851 A * 10/1957 Beck ................. 280/438.1
3,241,860 A * 3/1966 Janeway ............. 280/438.1
3,360,280 A * 12/1967 Betchart ............... 280/407
3,552,774 A * 1/1971 Gottler ............... 280/425.1
4,444,408 A * 4/1984 Goth .................. 280/438.1
5,851,021 A * 12/1998 Van Kley ............. 280/438.1
5,915,713 A * 6/1999 Kniep ................... 280/441
6,746,037 B1 * 6/2004 Kaplenski et al. ........ 280/484

FOREIGN PATENT DOCUMENTS

FR    2558429    *    7/1985

* cited by examiner

*Primary Examiner*—Tony Winner
(74) *Attorney, Agent, or Firm*—Craig C. Groseth

(57) ABSTRACT

A towing hitch assembly adapted to be connected to a towing unit and a towed unit is disclosed. In general, the towing hitch assembly comprises a support connector releasably attachable to a towing hitch of a towing vehicle and pivotally connected to at least two arms, a support structure adapted to be connected to the unit to be towed and pivotally connected to the arms, and at least two arms pivotally connected on one end to the support connector and pivotally connected on the other end to the support structure. The towing hitch assembly reduces jarring and other undesirable movement between the towing unit and the towed unit during operation.

25 Claims, 11 Drawing Sheets

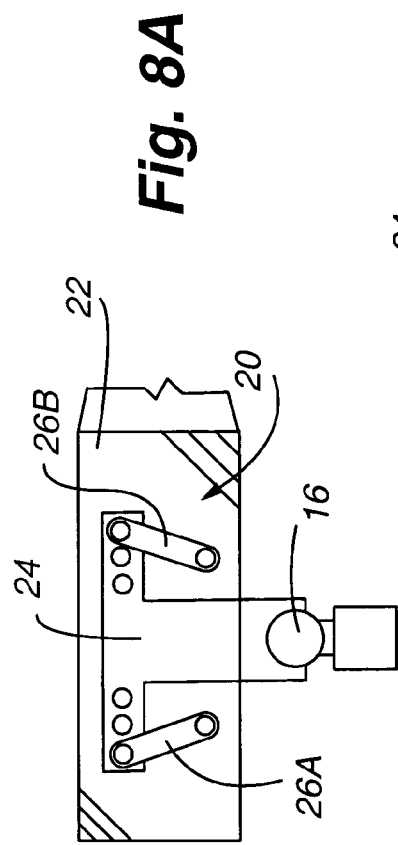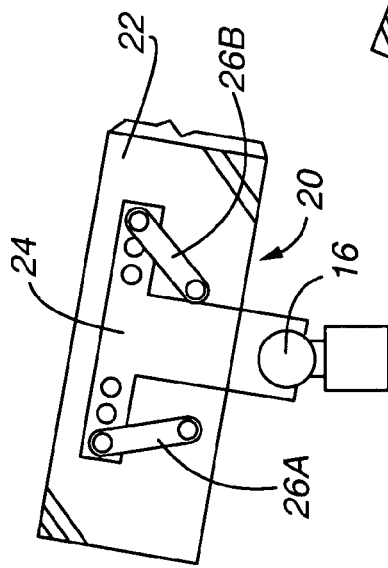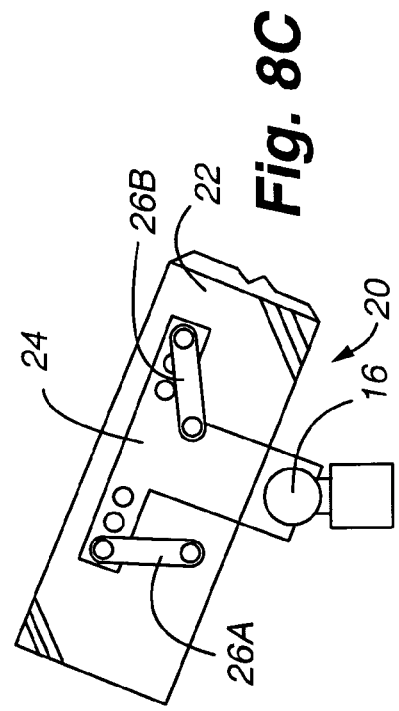

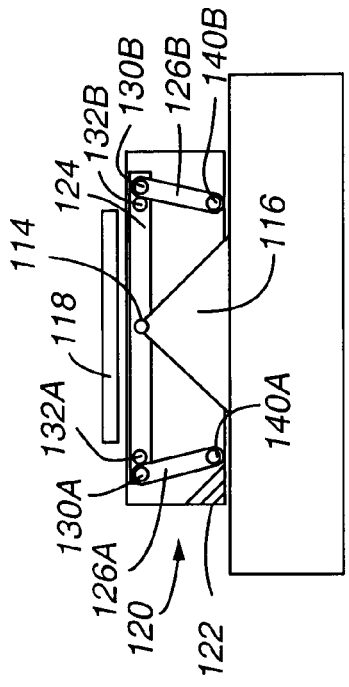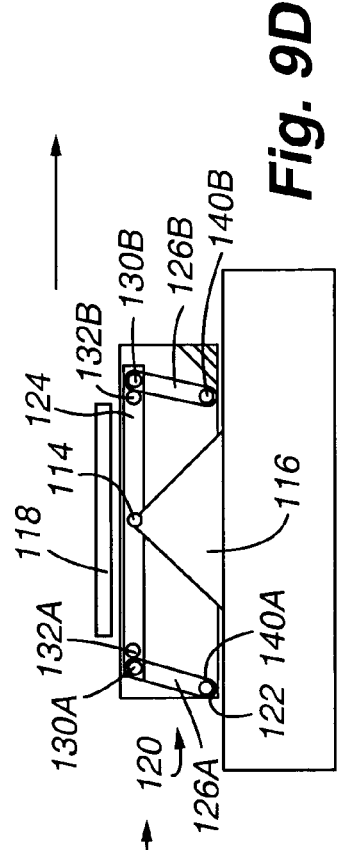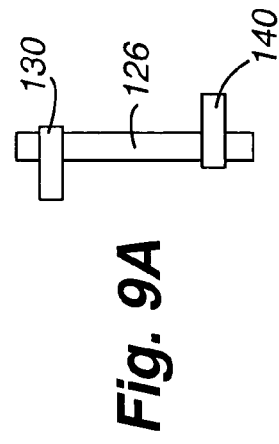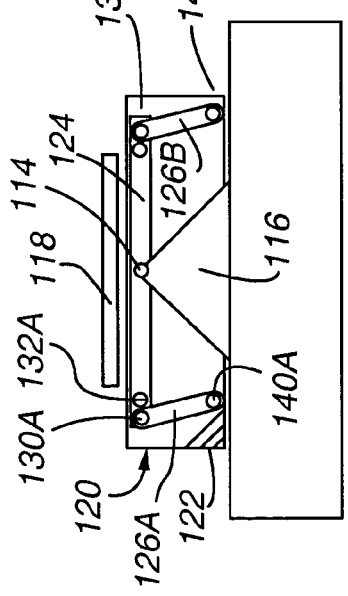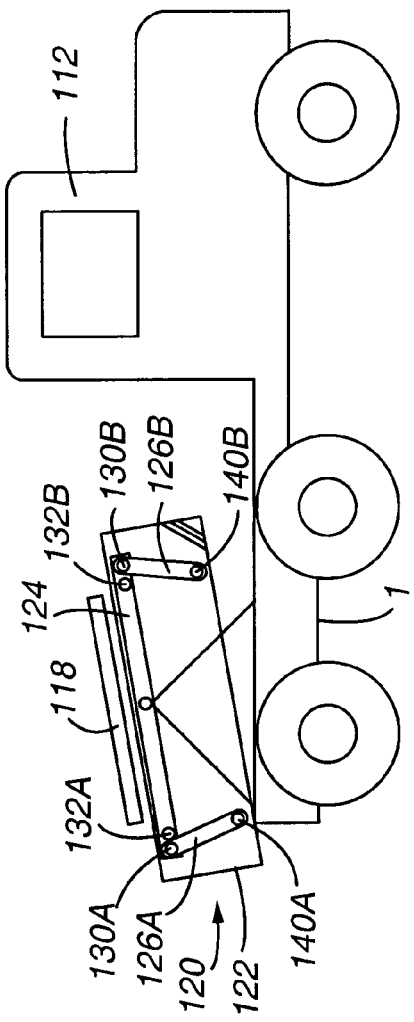

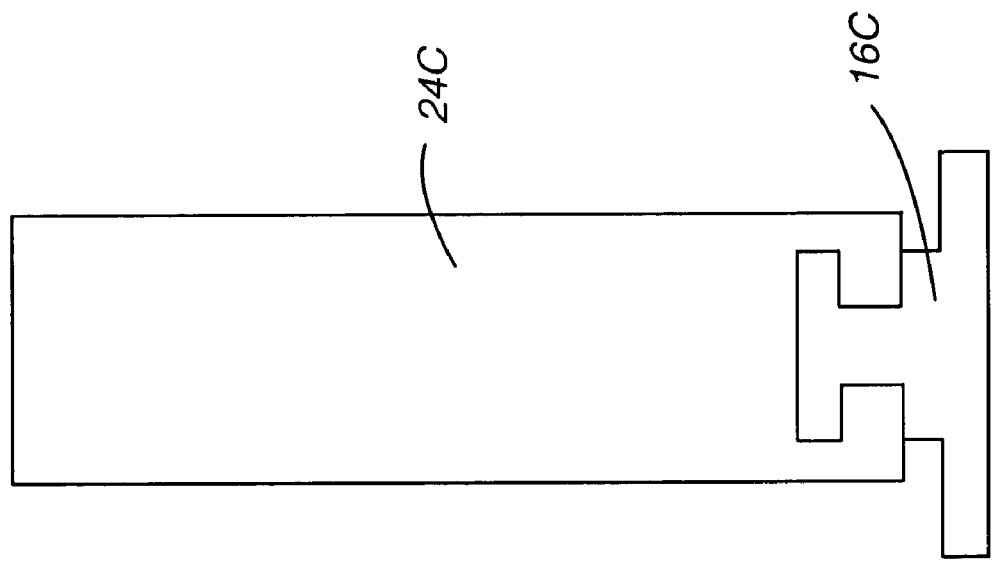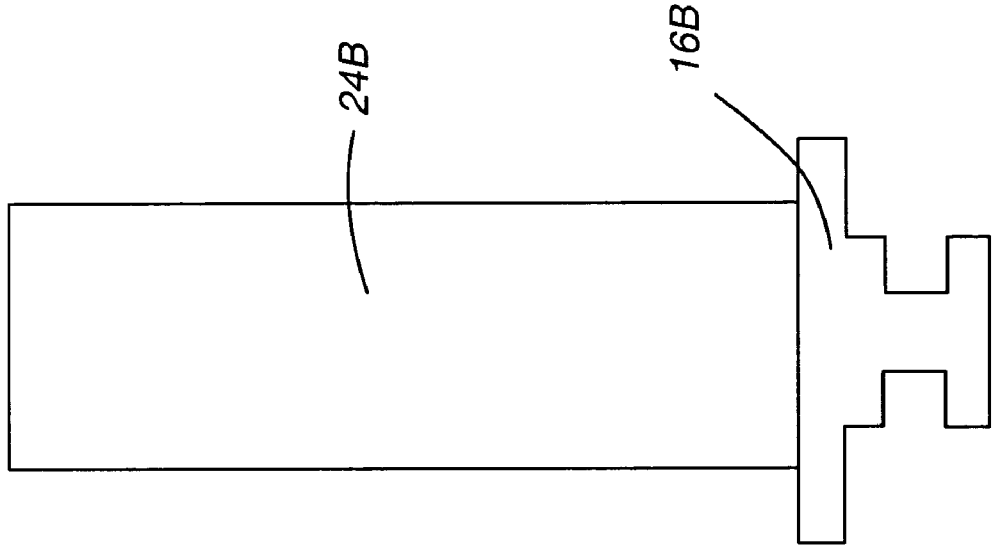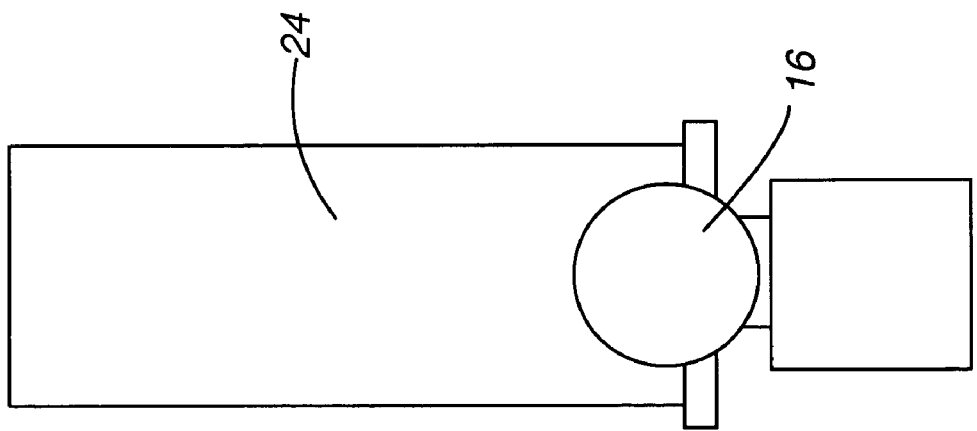

TOWING HITCH ASSEMBLY

CROSS-REFERENCE TO RELATED APPLICATION

Priority is claimed from U.S. Provisional Patent Application No. 60/415,426 filed on Oct. 1, 2002 and from U.S. Provisional Patent Application No. 60/415,960 filed on Oct. 2, 2002. The entire disclosure of these provisional applications are considered to be part of the disclosure herein and is incorporated by reference.

FIELD OF THE INVENTION

This invention generally relates to a towing hitch assembly adapted to be connected to a towing unit and a towed unit. The towing hitch assembly reduces jarring and other undesirable movement between the towing unit and the towed unit during operation.

BACKGROUND

There are a variety of mechanisms available to connect a towing unit such as a car, truck, or tractor-trailer with a unit desired to be towed, such as campers, boats, other small trailers, livestock trailers, and larger over-the-road trailers. Ball hitches, fifth wheel hitches, and tractor-trailer hitches are some examples of such existing mechanisms.

Regardless of the particular connection between the towing unit and the towed unit, the forces involving in towing frequently result in undesirable motion between the towing unit and the towed unit, including a back-to-back or jarring motion. For example, during acceleration or deceleration, the towing unit and the towed unit may get out of synchronization. That is, one unit may be accelerating at a greater rate than the other, or one unit may be decelerating at a greater rate than the other. This can create a jarring, back and forth motion between the towing unit and the towed unit. Rough roads, turns, and other variables during operation may also cause or increase the frequency, duration and/or extent of such motion.

Prior attempts to reduce, or smooth out, these undesirable forces in towing have not satisfactorily solved these issues. For example, air-ride truck-tractors, trailers with air-ride, and even air-ride cabs have been employed. Although these air-ride type of units may reduce a certain amount of undesirable vertical movement, they do not address the issue of back and forth jarring, which is a predominantly horizontal motion.

One proposed solution suspends a ball hitch of the towing vehicle on a swinging plate movably connected with swinging arms to a plate mounted to the rear of the towing vehicle. See U.S. Pat. No. 5,851,021. In that device, the swinging plate, and therefore the ball hitch itself, move forward and upward relative to the towing vehicle during acceleration, and move rearward and upward relative to the towing vehicle during deceleration. Although the swinging arms also are intended to move upward whether swinging fore or aft, the swinging plate and the ball hitch are intended to remain in constant angular orientation relative to the plate mounted to the rear of the towing vehicle. This device provides some reduction of the undesirable horizontal motion between a towing vehicle and a towed vehicle, but is overly active and lacks sufficient dampening under acceleration and deceleration.

Therefore, a need exists to reduce the amount of jarring between a towing unit and towed unit during operation, and particularly reduce the amount of non-vertical jarring during acceleration and deceleration.

DESCRIPTION OF THE DRAWINGS

FIGS. 8A–C is a composite diagram depicting the progressive movement of a towing hitch assembly of the present invention when undergoing the forces of deceleration, or braking, of the towing unit;

FIGS. 9A–E includes five different drawings generally showing aspects of another embodiment of the invention. FIG. 9A depicts a side schematic of a hinge arm and connectors. FIGS. 9B–E generally show one embodiment of the present invention, which is particularly suited for use with a hitch mechanism known as a fifth wheel, or a fifth wheel trailer.

FIGS. 10A–C depicts a schematic view of three different mechanisms to connect a towing unit to a towed unit. FIG. 10A depicts a ball hitch. FIG. 10B depicts a king pin. FIG. 10C depicts an inverted king pin. The present invention, as described more fully below, may be utilized with each of these hitches, as well as other mechanisms for connecting a towing unit to a towed unit;

DESCRIPTION OF THE INVENTION

Figure 1:
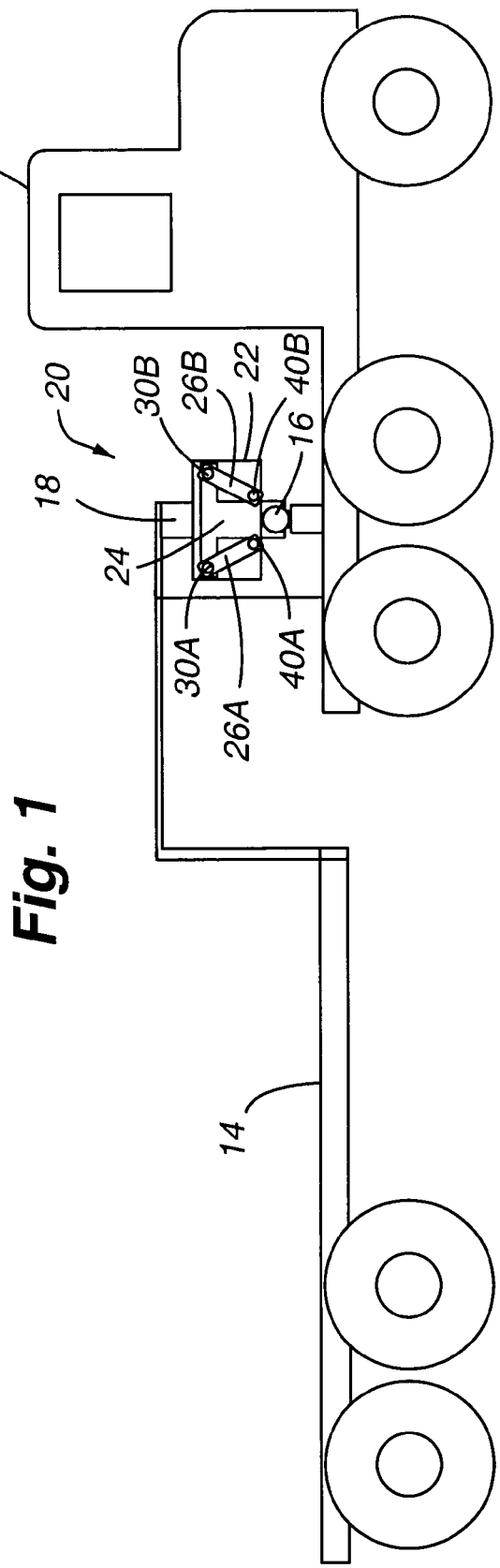
FIG. 1 is a side cut-away schematic depicting one embodiment of the towing hitch assembly of the present invention.

This invention generally relates to a towing hitch assembly adapted to be connected to a towing unit and a towed unit. The towing hitch assembly reduces jarring and other undesirable movement between the towing unit and the towed unit during operation.

In general, the towing hitch assembly comprises a support connector adapted to be releasably attachable to a towing hitch of a towing vehicle and adapted to be pivotally connected to at least two arms, a support structure adapted to be connected to the unit to be towed and adapted to be pivotally connected to the arms, and at least two arms adapted to be pivotally connected on one end to the support connector and adapted to be pivotally connected on the other end to the support structure.

The support connector is adapted to be releasably attachable to the towing hitch of the towing vehicle, such as a ball hitch, a king pin, an inverted king pin and other mechanisms for connecting a towing unit to a towed unit. Preferably, the support connector also is movably attachable to the towing hitch, thereby allowing the support connector to change its orientation relative to the towing hitch in response to operational forces. In the case of the towing hitch being a ball hitch, preferably the support connector provides a releasable connection to the ball hitch that also allows at least some rotational movement relative to the ball hitch.

The support connector may be configured in a variety of shapes and sizes, such as a horizontal bar shape, a T-shape and other shapes that allow for a pivotal connection to one end of at least one arm at a forward end of the support connector and one end of at least one arm at a rearward end of the support connector. In a preferred embodiment, the support connector is adapted to be pivotally connected to two arms at a forward end of the support connector and two arms at a rearward end of the support connector. In a more preferred embodiment, the support connector is further adapted to provide a plurality of positions for the pivotal connections for such arms, thereby allowing the selection or adjustment of the angle formed by the arm and/or the effective length of the arm.

The support structure is adapted to be connected to the trailing unit and preferably to be maintained in a fixed position relative to the trailer. The support structure may be configured in a variety of shapes and sizes, and is adapted to be pivotally connected to one end of at least one arm at a forward position of the support structure and to one end of at least one arm at a rearward position of the support structure. In a preferred embodiment, the support structure is adapted to be pivotally connected to two arms at a forward position of the support structure and two arms at a rearward position of the support structure. In a more preferred embodiment, the support structure comprises a top panel attached to two side panels to form a housing for the support connector and preferably the arms. Also, the support connector preferably is adapted to provide a plurality of positions for the pivotal connections for the arms, thereby allowing the selection or adjustment of the angle formed by the arm and/or the effective length of the arm.

The arms are adapted to be pivotally connected at one end to the support connector and to be pivotally connected at the other end to the support structure. The arms may be configured in a variety of shapes and sizes, and preferably are rectangular shaped bars of steel. Also, the arms may be adapted to provide a plurality of positions to pivotally connect with the support connector and/or the support structure, thereby allowing the selection or adjustment of the effective length of the arm and the angle of the arm relative to the support connector and/or support structure.

In a preferred embodiment, two arms are positioned at a forward end of the support connector and two arms are positioned at a rearward position of the support connector. Preferably, in a resting position, the two forward positioned arms are angled towards the rearward positioned arms, and the two rearward positioned arms are angled towards the forward positioned arms, thereby forming an angle other than vertical. The preferred angle formed by each of the arms depends on the particular application. For a typical ball hitch application, the arms preferably are substantially the same length and positioned at substantially the same angle, with the forward arms and the rearward arms being angled towards each other. Even more preferably, the top end of each arm is positioned further from the hitch, in a horizontal dimension, than is the bottom end of each arm, with each arm forming an angle of approximately 4 degrees to approximately 10 degrees, and more preferably to approximately 6 degrees to approximately 7 degrees.

The support connector, the support structure and the arms may be constructed of any material suitable for handling the forces involved, such as other metals, alloys, composites, and combinations thereof. Preferably the support connector and the support structure are constructed of hot roll material steel. Preferably, the arms are constructed of CRO 1045 or 1018 steel.

The arms may be pivotally connected to the support connector and to the support structure by a variety of mechanisms, and preferably the arms, support connector and support structure are each provided with a circular hole through which a connecting steel pin may be inserted to provide the desired pivotal connection.

In a preferred embodiment, the support structure comprises a top panel connected to at least two side panels to form a housing, in which at least a portion of the support connector and the arms are housed, and more preferably substantially all of the support connector and the arms are housed. The dimensions of the components are designed for the particular application, e.g., the amount of load and the type of hitch. For a typical ball hitch trailering application, the support structure is preferably in the range of approximately 12 inches to approximately 20 inches long, approximately 4 inches to approximately 8 inches wide, and approximately 4 inches to approximately 10 inches high, and more preferably approximately 16 inches long, approximately 6 inches wide and approximately 7 inches high. For that application, the support connector is preferably in the range of approximately 6 inches to approximately 12 inches long, approximately 1 inch to approximately 4 inches wide, and approximately 4 inches to approximately 8 inches high, and more preferably approximately 8 inches to approximately 10 inches long, approximately 2 inches to approximately 3 inches wide and approximately 5 inches to approximately 6 inches high. For that application, the arms are preferably in the range of approximately 2 inches to approximately 12 inches long, approximately ½ inch to approximately 1 inch thick, and approximately 2 inches to approximately 5 inches wide, and more preferably are approximately ½ inch thick, approximately 5½ inches long and approximately 2 inches high.

Figure 2:
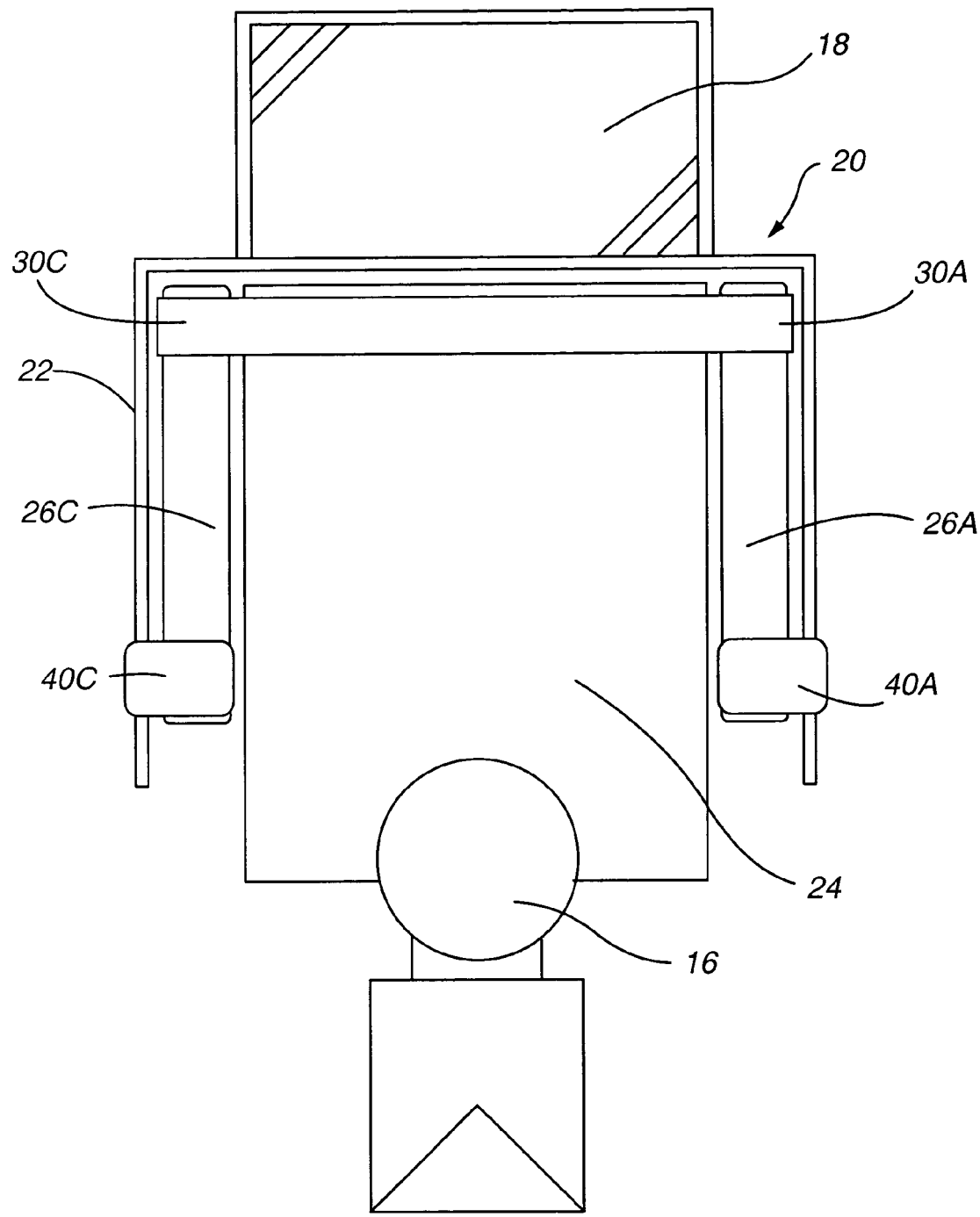
FIG. 2 is a rear cut-away schematic of the embodiment of the towing hitch assembly shown in FIG. 1.
Figure 3:
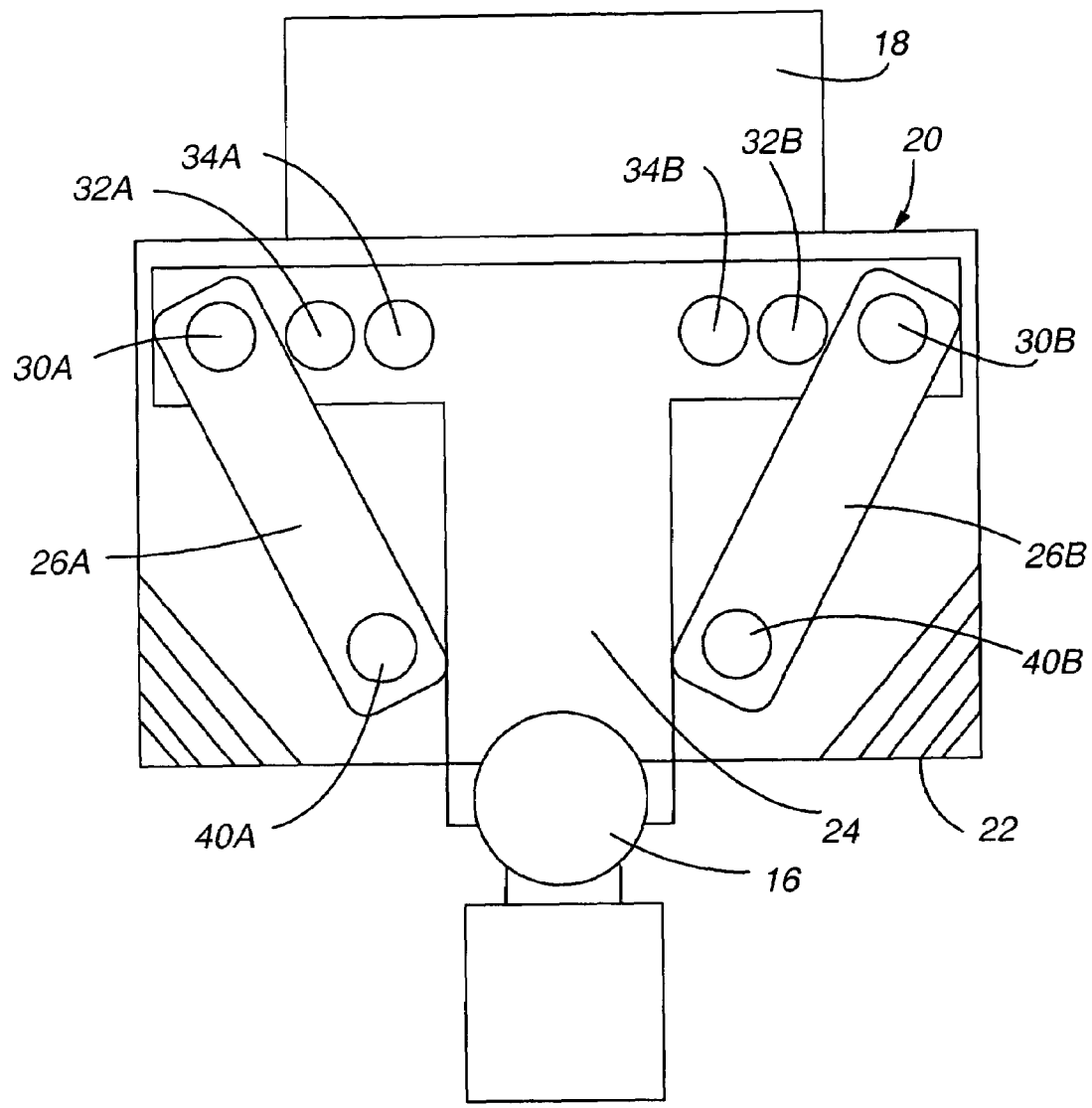
FIG. 3 is a cut-away side schematic of the towing hitch assembly shown in FIG. 1, showing adjustability of the angle of arms 26A and 26B, among other things.

Now referring to the embodiment show in FIGS. 1–4, a trailering assembly 10 comprises a towing unit 12 having a hitch 16 removably and adjustably connected to towing hitch assembly 20, which is connected by connector 18 to trailer 14. Towing hitch assembly 20 comprises support connector 24, arms 26A, 26B, support structure 22, pivotal connections 30A, 30B and pivotal connections 40A, 40B. FIG. 2 depicts a rear cut-away schematic view of the towing hitch assembly 20 of FIG. 1, and further shows pivotal connections 30C, 40C. FIG. 3 depicts a side cut-away schematic view of the towing hitch assembly 20 of FIG. 1, and further shows a plurality of horizontal-spaced positions on support connector 24 for the pivotal connections 30A, 32A, 34A for arm 16A and the pivotal connections 30B, 32B, 34B for arm 26B.

Support connector 24 is adapted to be removably connected to hitch 16, and preferably is adapted to be movably connected to hitch 16, as will be described further below. The support connector 24 also is adapted to be pivotally connected to one or more arms. In the embodiment shown in FIGS. 1–4, there are four of such arms: arms 26A, 26B are shown in FIGS. 1 and 3, arms 26A, 26C are shown in FIG. 2, and arm 26D would appear directly behind arm 26C in Figure B and directly behind arm 26B in FIG. 3.

The arms 26A–D are pivotally connected at or near one end to support connector 24 and pivotally connected at or near the other end to support structure 22. For example, in FIGS. 1–4, one end of arm 26A is pivotally connected by pivotal connection 40A to a portion of the support structure 22 and the other end of arm 26A is pivotally connected by pivotal connection 30A to a portion of support connector 24. Similarly, arms 26C–D are pivotally connected at or near one end to support connector 24 and at or near the other end to support structure 22.

FIG. 3 also shows an additional embodiment of the invention in which support connector 24 is adapted to provide a plurality of positions in which to connect arms 26A–D. By selecting the location of the pivotal connection for the arms 26A–D and support connector 24, one may adjust the characteristics of the towing hitch assembly 20. For example, the arms 26A–D are preferably not aligned vertically, i.e., not aligned at a 90° angle to the ground, when the towing hitch assembly is at rest. If the arms 26A–D were aligned vertically, the towing hitch assembly 20 would tend to move horizontally too readily and easily. It is believed that such a vertical alignment would not provide the desired resistance cushion to the jarring forces and/or would require additional mechanisms, such as bushings, dampeners, cushions or other devices to adequately provide the desired resistance. More preferably, the arms 26A and 26B are configured to toe in, i.e., to angle in towards each other and, even more preferably, to angle in towards each other and towards the hitch 16 itself.

Figure 4:
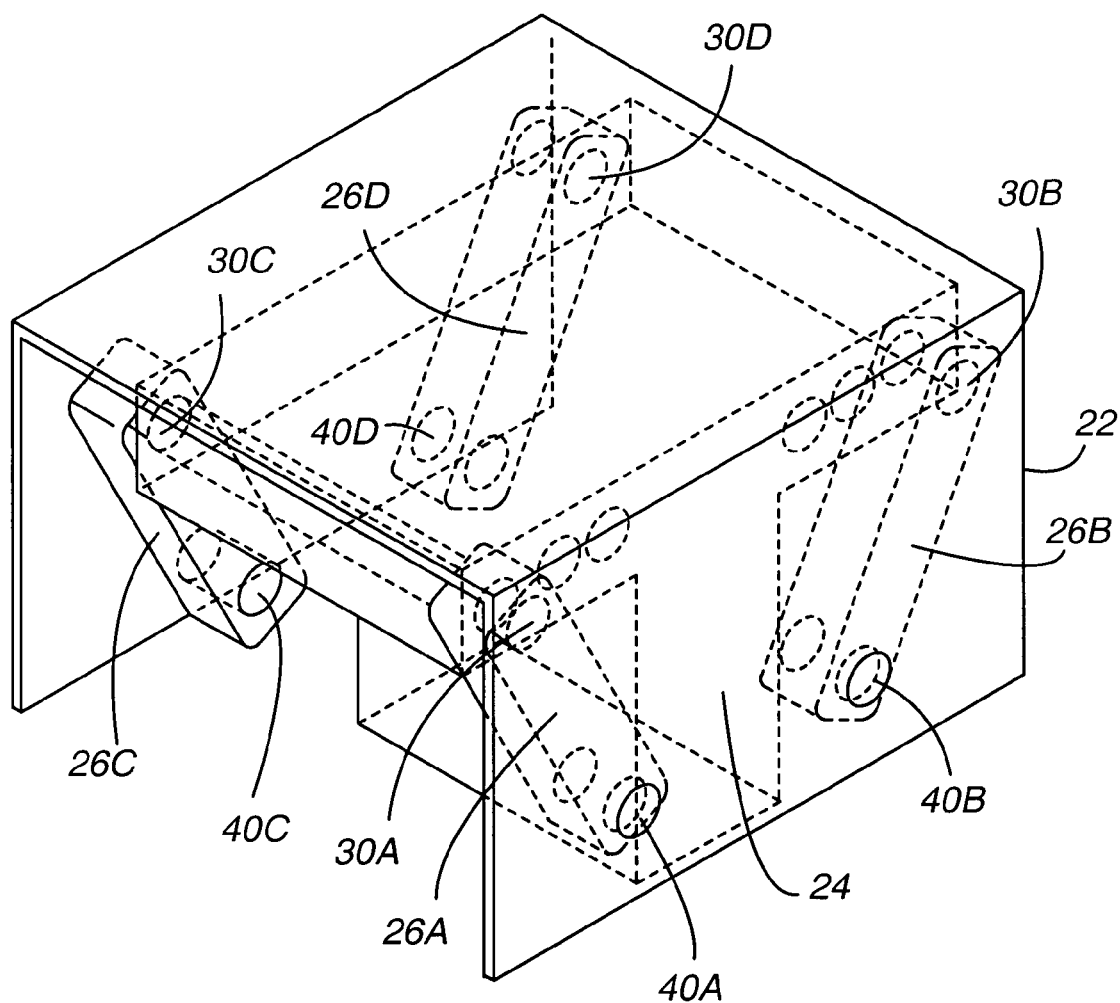
FIG. 4 is a perspective schematic of the embodiment of the invention shown in FIGS. 1–3.

As shown in FIG. 3, it is even more preferred that the end of arms 26A, 26B be pivotally connected to the support connector 24 at pivotal connections 30A, 30B, which are located at a further distance in a horizontal direction from hitch 16 than the corresponding other end of arms 26A, 26B affixed to the support structure 22 at pivotal connections 40A, 40B. As shown in FIG. 3, this preferred embodiment includes a support connector 24 extending vertically from hitch 16 to a certain height before extending horizontally in at least two directions to form a T-shaped structure in cross-section. Along the arms of the T-shaped structure of support connector 24, there are positions and mechanisms in which to attach arms 26A, 26B at or near one end at pivotal connections 30A, 30B or pivotal connections 32A, 32B or pivotal connections 34A, 34B. Similarly, there may be multiple positions and mechanisms in which to attach arms 26A, 26B at or near the other end to support structure 22, as shown in FIG. 4 by the multitude of pivotal connections 40A, 42A, 44A and pivotal connections 40B, 42B, 44B on support connector 24.

As shown in FIG. 3, the pivotal connections 40A, 40B are closer in a horizontal dimension to hitch 16 than are pivotal connections 30A, 30B. Also, the end of arms 26A, 26B may be moved to a different position in support connector 24, which changes the horizontal position and angle of arms 26A, 26B relative to support connector 24 and, therefore, relative to hitch 16. Generally, as the angle created by arms 26A, 26B and the vertical extension of support connector 24 becomes more acute, i.e., the further apart in the horizontal direction between pivotal connections 30A, 40A, the further support connector 24A will travel when under load, which results in the towing hitch assembly 20 becoming stiffer and more difficult to move. In contrast, as the angle between arms 26A, 26B and the vertical component of support connector 24 becomes less acute, i.e., the closer together in the horizontal direction between pivotal connections 30A, 40A, the support connector 24 is more easily moved under load. Preferably, the angle of arms 26A, 26B, 26C and 26D are approximately 4 degrees to approximately 10 degrees off vertical and more preferably approximately 6 degrees to approximately 7 degrees off vertical.

Without being bound by any theory, it is believed that when the arms 26A, 26B are essentially vertical, the horizontal movement of the trailer relative to the truck is resisted by the friction in the pivotal connections 30A, 30B, 40A, 40B. However, when the arms 26A, 26B are inclined at an angle towards horizontal, i.e., not essentially vertical, and preferably inclined inward towards each other, the horizontal movement of the trailer relative to the truck is additionally resisted by the friction in the pivotal connections 30A, 30B, 40A, 40B, the tension and compression in the arms 26A, 26B, and the tongue weight of the trailer. As the towing hitch assembly 20 begins to move relative to the truck, the towing hitch assembly 20 rotates and must displace vertically upward, which is resisted by the tongue weight. It is believed that as the towing unit accelerates or decelerates, the assembly of the present invention functions to place a greater force on the ball hitch, thereby enhancing the releasable and movable connection between the towing unit and the towed unit. This results in a better and more stable connection and increases the safety of the towing operation.

As shown in FIG. 3, the towing hitch assembly 20 includes connector 18 and support structure 22, which are attachable to a part of the trailer to be pulled. Connector 18 and support structure 22 preferably maintain a fixed position relative to the trailer. In a preferred embodiment shown in FIG. 3, the towing hitch assembly 20 is at rest, and load weight and/or gravity makes it find its own center. Connector 18 may be on top of support structure 22, as shown in FIG. 3, on the rear of support structure 22, on one or both sides of support structure 22, depending on the unit to be towed and the hitch to be employed.

Figure 5:
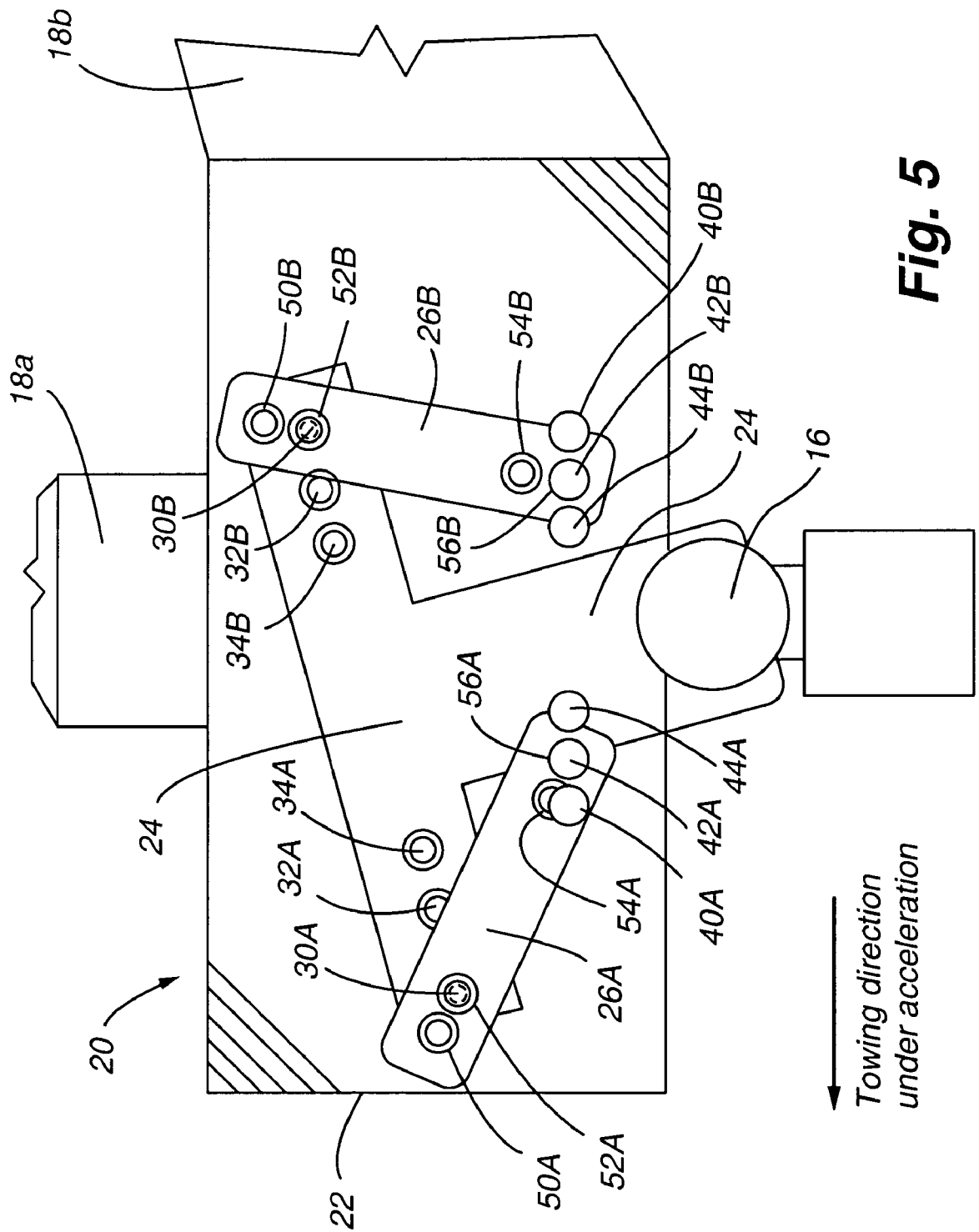
FIG. 5 is a cut-away side schematic of a towing hitch assembly shown in FIG. 1, showing the adjustability of the angle and length of the arms 26A and 26B, among other things, and showing movement of the towing hitchy assembly when subjected to forces resulting from acceleration of the towing unit.

Referring now to FIG. 5, one embodiment of the towing hitch assembly 20 is depicted under the forces of acceleration, in the direction indicated as right to left. Towing hitch assembly 20 may be attached to the towing unit by hitch 16 and connected to the towed unit by a suitable connector, shown here as connector 18A, at the top of support structure 22, or by connector 18B, at the rear of support structure 22. As the towing unit accelerates, the support connector 24 rotates about ball hitch 16 due to the acceleration forces and due to the interaction of the support connector 24, the support structure 22 and the arms 26A–D pivotally connected to them. The forward arm 26A operates like a crank arm with no stop and the rearward portion of support connector 24 and support structure 22 tilt upward, the movement of which is resisted by the load placed on the towing hitch assembly 20 by the towed unit.

As the forces from acceleration increase, the pivoting action of the arms 26A–D causes the support connector 24 to further rotate about and put additional pressure onto ball hitch 16. The support connector 24 and the support structure 22 tilt or angle further toward the direction of the acceleration. Although not being bound by any theory, it is believed that this generally brings the load closer to ball hitch 16 and further away from arms 26A–D. In this case, the arms 26A and 26C move towards horizontal, while the opposing arms 26B and 26D move towards vertical. As arms 26A and 26C move more towards horizontal, arms 26B and 26D resist this movement and absorb shock. The pivoting action of the arms 26A–D and the support connector 24 essentially move the support connector 22, the connector 18 and thereby the load of the trailer closer to and place greater force onto ball hitch 16. In operation of a typical ball hitch, the support connector 24 preferably tilts approximately 8 degrees to approximately 16 degrees, and more preferably approximately 12 degrees. This facilitates a safer, smoother and more efficient transfer of force from the towing unit to the trailer.

Whether at rest or in motion, arms 26A–D are not intended to be and would not move into a vertical position, e.g., relative to support structure 22 or hitch 16. If arms 26A–D were in essentially a vertical position, it is believed that the arms 26A–D would not operate to provide sufficient shock absorption, resistance and/or dampening, as set forth above. That is, it is believed that arms 26A–D in a vertical position while at rest would not create the desired resistance but would rock back and forth too easily when under towing forces.

FIG. 5 also shows the arms 26A, 26B being adapted to allow for the adjustment of the affective length of such arms. For example, arm 26A is provided with a connecting means (here, circular joint 50A and 52A) at different locations along the length of arm 26A. When connecting arm 26A is pivotally connected to support connector 24 at the circular joint 50A, the effective length of arm 26A is longer than if arm 26A were pivotally connected at circular joint 52A. In general, one would be able to select an effective length of the arms 26A, 26B to optimize performance under the desired circumstances such as the weight of the load and/or the towed unit, the weight and/or power of the towing unit, the amount of travel needed, and other variables.

Referring still to FIG. 5, the other end of the arms 26A, 26B that is pivotally connected to support structure 22 maybe connected at various positions on support structure 22. For example, arm 26A may be pivotally connected to support structure 22 at locations 40A, 42A or 44A. Similarly, arm 26B may be pivotally connected to support structure 22 at locations 40B, 42B and 44B. In general, the heavier the load to be towed in the towed unit, the greater the preferred separation between the arms 26A, 26B at the lower location of the arms 26A, 26B. That is, as the load to be borne at the connectors 18A or 18B increases, it would be preferred to move the pivotal connection of arm 26A from 44A to 42A and ultimately to 40A to handle the increased load. Moving one or more pivot points may significantly affect performance. The variable resistance and adjustability of the towing hitch assembly 20 may be accomplished by alternate mechanisms.

Referring again to FIG. 5, as the towing unit accelerates, the support connector 24 rotates forward on the hitch 16 through the action of the pivotal connection 52A and 42A on arm 26A and the pivotal connections 52B and 42B on arm 26B. The rotation of support connector 24 is tempered and ultimately confined or restricted by the arm 26B in the case of the acceleration shown in FIG. 5. That is, in FIG. 5, the arm 26B prevents the support connector 24 from continuing to rotate about hitch 16 beyond a desired position. The effective length of arm 26B may be changed to change the extent of this rotation.

Also, FIGS. 6A–C depicts a composite drawing showing the relative positioning of the towing hitch assembly 20 during acceleration in the indicated direction of right to left. In FIG. 6A, the towing hitch assembly 20 is shown at rest, or at constant velocity. In FIG. 6B, as the towing unit is accelerating from right to left, the towing hitch assembly 20 depicts the changing positions of the support connector 24 and the arms 26A, 26B relative to the support structure 22 and the hitch 16, reflecting the additional resistance to and dampening of the forces between the acceleration of the towing unit and the relatively lagging acceleration of towed unit. In FIG. 6C, as the towing unit continues to accelerate and additional forces are exerted, the towing hitch assembly 20 depicts its further changing of position, which provide additional resistance to and dampening of such forces.

Figure 7:
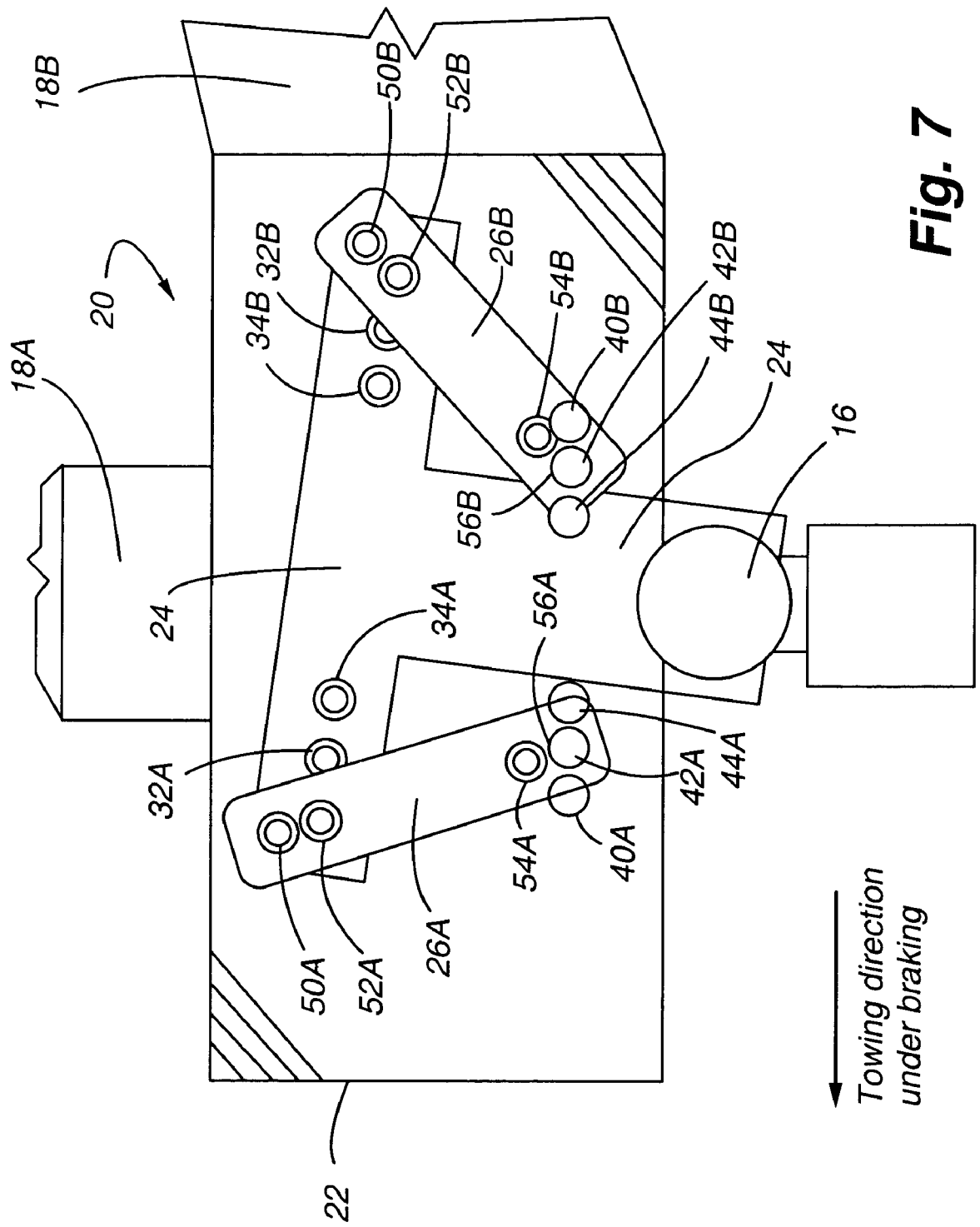
FIG. 7 is a cut-away side schematic of a towing hitch assembly shown in FIG. 1, showing the adjustability of the angle and length of the arms 26A and 26B, among other things, and showing movement of the towing hitch assembly when subjected forces resulting from deceleration, or braking, of the towing unit.

FIG. 7 depicts the embodiment of the invention depicted in FIGS. 1–4 in operation of the invention when the towing unit is breaking in the indicated direction of right to left. The apparatus generally operates in the same manner as acceleration in FIG. 5, but in the opposite direction.

Figure 6:
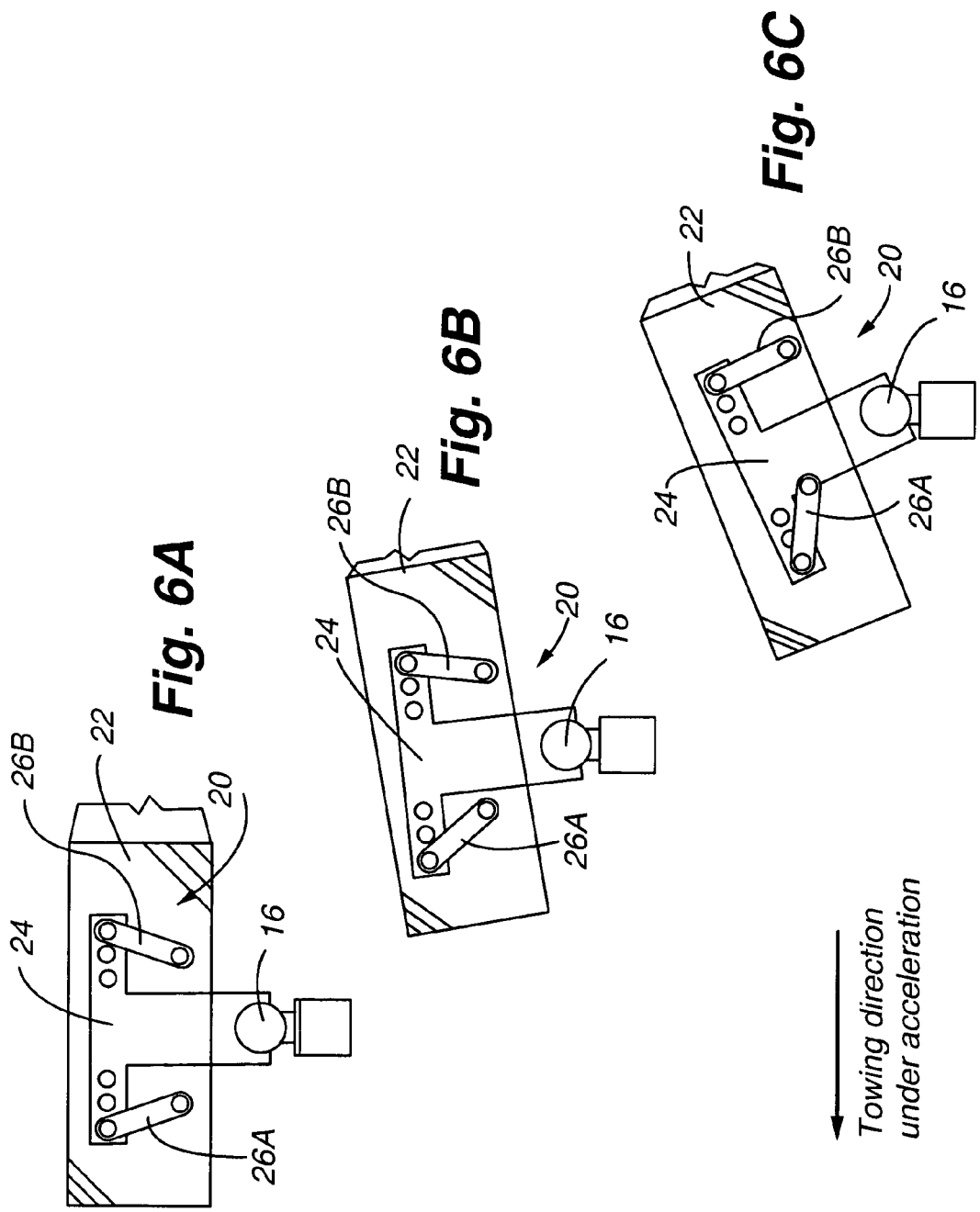
FIGS. 6A–C is a composite diagram depicting the progressive movement of a towing hitch assembly of the present invention when undergoing the forces of acceleration of the towing unit.

FIG. 8 is similar to FIG. 6, except that it shows the forces on the towing hitch assembly 20 during deceleration, or braking, in the indicated direction of right to left. Again, the towing hitch assembly generally functions in the same manner as acceleration in FIG. 6, except in the opposite direction. That is, In FIG. 8A, the towing hitch assembly 20 is shown at rest, or at constant velocity. In FIG. 8B, as the towing unit is decelerating, or braking, from right to left, the towing hitch assembly 20 depicts the changing positions of the support connector 24 and the arms 26A, 26B relative to the support structure 22 and the hitch 16, reflecting the additional resistance to and dampening of the forces between the deceleration of the towing unit and the relatively lagging deceleration of towed unit. In FIG. 8C, as the towing unit continues to decelerate and additional forces are exerted, the towing hitch assembly 20 depicts its further changing of position, which provide additional resistance to and dampening of such forces.

FIGS. 9A–E depicts another embodiment of the present invention. In this embodiment, the towing hitch assembly 120 is adapted for use with a fifth wheel trailer and hitch assembly. In this embodiment, as shown in FIG. 9E, the fifth wheel is attached to the frame of a truck and the towing hitch assembly 120 is preferably attached to part of the truck, as opposed to being attached to the trailer, as in the embodiments shown in FIGS. 1–8.

FIG. 9A depicts a side view of arm 126 with pivotal connector 130 and pivotal connector 140. As shown in FIGS. 9B–E, arm 126A and arm 126B are pivotally connected at one end to hinge 124 and pivotally connected at the other end to support structure 122. Hinge arm 124 also has a pivot point at its center and provides the same function to towing hitch assembly 120 of FIG. 9A–E as support connector 24 provides to towing hitch assembly 20 of FIGS. 1–8. In a preferred embodiment, hinge arm 124 is pivotally connected to pivotal connections 140A, 140B along one side of the towing hitch assembly 120 and is connected by an equalizer bar (not shown) that extends traversely across the width of towing hitch assembly 120 to a second hinge arm (not shown) that is configured and designed to work with hinge arm 124 and to provide the same function as hinge arm 124, but on the other side of the towing hitch assembly 120. Connector 118 is adapted to connect the truck to the trailer.

FIGS. 9B–E, the hitch 116 is rotatably connected to hinge arm 124, which is pivotally connected to one or more arms 126A, 126B, 126C (not shown), 126D (not shown). Hinge arm 124 also is pivotally connected to hitch 116 at or near the center of the length of hinge arm 124. Arms 126A, 126B are pivotally connected at one end to the hinge arm 124 and are pivotally connected at their other end to support structure 122. As with the prior embodiment shown in FIGS. 1–8, the length of arms 126A–D may be modified or adapted to be adjustable for the particular application. The preferred length of the arms would depend generally on the amount of load to be towed. Also, the relative positioning of the arms 126A–D along the horizontal length of support connector 124 and along the horizontal length of support structure 122 may be selected and adjusted for the particular application, as described in more detail above. FIG. 9B depicts the towing hitch assembly 116 while at rest, or at constant velocity, i.e., not under acceleration or deceleration.

FIG. 9C depicts the movement and function of the towing hitch assembly 120 when the towing unit is under braking in the direction indicated left to right. As is apparent from FIG. 9C, the towing hitch assembly 120 functions in substantially the same manner as the embodiment of the inventions shown in FIGS. 1–8, and particularly as the towing hitch assembly 20 shown under braking, as shown in FIG. 8.

Similarly, FIG. 9D depicts the movement and function of the towing hitch assembly 120 when the towing unit is under acceleration in the indicated direction of left to right. The embodiment of the invention depicted in FIGS. 9A–E works substantially in the same manner as the embodiment of the invention depicted in FIGS. 1–9, but has been modified to adapt to the different configuration of the hitch assembly between the towing unit and the towed unit. Alternative embodiments of the invention may be utilized for other types of hitch assemblies.

Now referring to FIG. 10, a schematic view of three different mechanisms to connect a towing unit to a towed unit are shown. FIG. 10A depicts a ball hitch. FIG. 10B depicts a king pin. FIG. 10C depicts an inverted king pin. The present invention may be advantageously utilized with each of these hitches and other mechanisms for connecting a towing unit to a towed unit.

Figure 11:
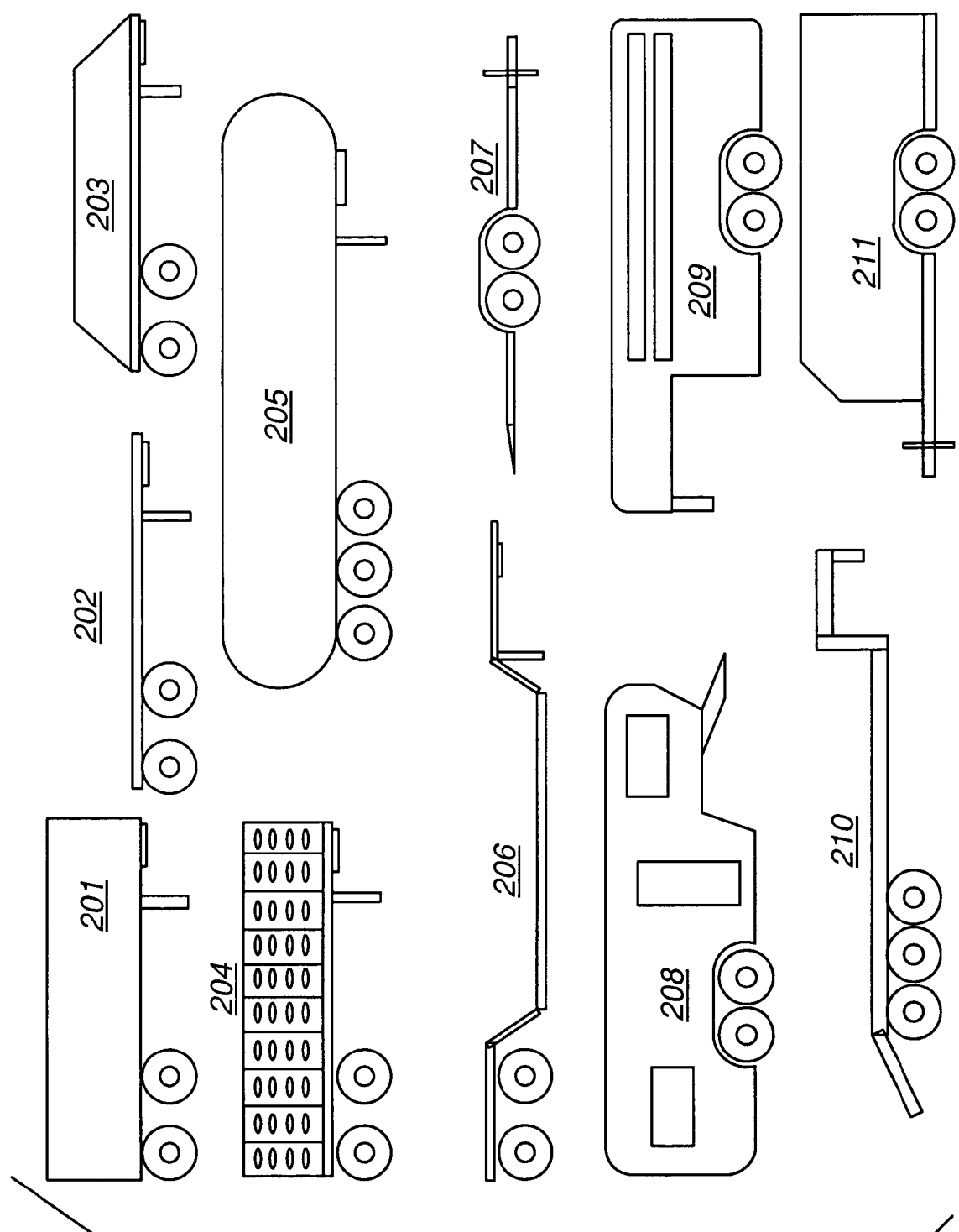
FIG. 11 depicts a number and a variety of trailers, among others, that may be connected to a towing unit with one or more of the embodiment of the present invention.

FIG. 11 depicts a number and variety of trailers that may be towed advantageously with the towing hitch assembly of the present invention. Trailers 201, 202, 203, 204, 205 and 206 may generally be considered as being capable of being towed by a large truck that would typically have a hitch assembly and a towing hitch assembly as depicted in FIG. 9. Trailers 207, 208, 209, 210 and 211 may generally be characterized as relatively smaller towing units which typically would have a hitch that would be utilized with the towing hitch assembly 20 depicted in FIGS. 1–8.

The towing hitch assembly of the present invention improves the safety, reliability, durability, and functioning of towing loads by reducing the strain on both the towed unit and the towing unit. The current invention makes the connection between the towed unit and the towing unit more secure, more safe, and capable of providing desired resistance to cushion jarring during operation. The invention provides such advantages and improvements, without the need for bushings, cushions, dampeners, air, hydraulics or rubber bumpers, and reduces the undesirable forward and backward movement between the towing unit and the towed unit.

The foregoing description of the present invention has been presented for purposes of illustration and description. The description is not intended to limit the invention to the form disclosed herein. Consequently, variations and modifications commensurate with the above teachings, and the skill or knowledge of the relevant art, are within the scope of the present invention. The embodiment described herein is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An assembly for a towing hitch comprising:
a support connector adapted to be removably and movably connected to a towing hitch and pivotally connected to at least two arms;
a support structure adapted to be connected to a trailer and pivotally connected to the at least two arms;
a first arm pivotally connected at a first end to the support connector at a first position and pivotally connected at a second end at a first position to the support structure, and
a second arm pivotally connected at a first end to the support connector at a second position and pivotally connected at a second end at a second position to the support structure,
wherein the support connector is T-shaped in cross section.

2. The assembly of claim 1, wherein the first position of the first arm is along the horizontally extending portion of one end of the T-shaped support connector and the first position of the second arm is along the other end of the horizontally extending portion of the T-shaped support connector.

3. An assembly for a towing hitch comprising:
a support connector adapted to be removably and movably connected to a towing hitch and pivotally connected to at least two arms;
a support structure adapted to be connected to a trailer and pivotally connected to the at least two arms;
a first arm pivotally connected at a first end to the support connector at a first position and pivotally connected at a second end at a first position to the support structure, and
a second arm pivotally connected at a first end to the support connector at a second position and pivotally connected at a second end at a second position to the support structure,
wherein the support connector is adapted to provide a plurality of positions to which the first arm and the second arm may be pivotally connected.

4. An assembly for a towing hitch comprising:
a support connector adapted to be removably and movably connected to a towing hitch and pivotally connected to at least two arms;
a support structure adapted to be connected to a trailer and pivotally connected to the at least two arms;
a first arm pivotally connected at a first end to the support connector at a first position and pivotally connected at a second end at a first position to the support structure, and
a second arm pivotally connected at a first end to the support connector at a second position and pivotally connected at a second end at a second position to the support structure,
wherein the support structure comprises a top panel connected to at least two side panels forming a housing within which at least a portion of the support connector is housed.

5. The assembly of claim 4, wherein at least a portion of the first arm and the second arm are housed in the housing.

6. The assembly of claim 4, wherein substantially all of the support connector, the first arm and the second arm are housed in the housing.

7. An assembly for a towing hitch comprising:
a support connector adapted to be removably and movably connected to a towing hitch and pivotally connected to at least two arms;

a support structure adapted to be connected to a trailer and pivotally connected to the at least two arms;

a first arm pivotally connected at a first end to the support connector at a first position and pivotally connected at a second end at a first position to the support structure, and a second arm pivotally connected at a first end to the support connector at a second position and pivotally connected at a second end at a second position to the support structure, wherein the support structure is adapted to provide a plurality of positions in the horizontal direction to which at least one of the first arm and the second arm may be selectively pivotally connected.

8. An assembly for a towing hitch comprising:

a support connector adapted to be removably and movably connected to a towing hitch and pivotally connected to at least two arms;

a support structure adapted to be connected to a trailer and pivotally connected to the at least two arms;

a first arm pivotally connected at a first end to the support connector at a first position and pivotally connected at a second end at a first position to the support structure, and a second arm pivotally connected at a first end to the support connector at a second position and pivotally connected at a second end at a second position to the support structure, wherein the first arm is adapted to provide a plurality of positions for the pivotal connection to at least one of the support connector and the support structure.

9. An assembly for a towing hitch comprising:

a support connector adapted to be removably and movably connected to a towing hitch and pivotally connected to at least two arms;

a support structure adapted to be connected to a trailer and pivotally connected to the at least two arms;

a first arm pivotally connected at a first end to the support connector at a first position and pivotally connected at a second end at a first position to the support structure, and a second arm pivotally connected at a first end to the support connector at a second position and pivotally connected at a second end at a second position to the support structure, wherein the second arm is adapted to provide a plurality of positions for the pivotal connection to at least one of the support connector and the support structure.

10. An assembly for a towing hitch comprising:

a support connector adapted to be removably and movably connected to a towing hitch and pivotally connected to at least two arms;

a support structure adapted to be connected to a trailer and pivotally connected to the at least two arms;

a first arm pivotally connected at a first end to the support connector at a first position and pivotally connected at a second end at a first position to the support structure, and a second arm pivotally connected at a first end to the support connector at a second position and pivotally connected at a second end at a second position to the support structure, wherein the first arm forms a line at an angle other than vertical.

11. The assembly of claim 10, wherein the second arm forms a line at an angle other than vertical.

12. The assembly of claim 11, wherein the second arm forms an angle in the range of approximately 4 degrees to approximately 10 degrees relative to vertical.

13. The assembly of claim 11, wherein the second arm forms an angle in the range of approximately 6 degrees to approximately 8 degrees relative to vertical.

14. The assembly of claim 10, wherein the first arm forms an angle in the range of approximately 4 degrees to approximately 10 degrees relative to vertical.

15. The assembly of claim 10, wherein the first arm forms an angle in the range of approximately 6 degrees to approximately 8 degrees relative to vertical.

16. An assembly for a towing hitch comprising:

a support connector adapted to be removably and movably connected to a towing hitch and pivotally connected to at least two arms;

a support structure adapted to be connected to a trailer and pivotally connected to the at least two arms;

a first arm pivotally connected at a first end to the support connector at a first position and pivotally connected at a second end at a first position to the support structure, and a second arm pivotally connected at a first end to the support connector at a second position and pivotally connected at a second end at a second position to the support structure, wherein the first arm and the second arm angle in towards each other.

17. A towing hitch assembly comprising:

a support connector comprising a first side and a second side and comprising a first end and a second end, the support connector being removably and rotatably attachable to a towing hitch and pivotally connected to four arms, a support structure comprising a first side and a second side and comprising a first end and a second end, the support structure being adapted to be connected in a fixed relationship to a unit to be towed and pivotally connected to the four arms, a first arm pivotally connected at a first end to the first side and at the first end of the support connector and pivotally connected at a second end to the first side and at the first end of the support structure, a second arm pivotally connected at a first end to the first side and at the second end of the support connector and pivotally connected at a second end to the first side and at the second end of the support structure, a third arm pivotally connected at a first end to the second side and at the first end of the support connector and pivotally connected at a second end to the second side and at the first end of the support structure, a fourth arm pivotally connected at a first end to the second side and at the second end of the support connector and pivotally connected at a second end to the second side and at the second end of the support structure, wherein the first arm and the second arm are aligned at an angle other than parallel to each other, and wherein the third arm and the fourth arm are aligned at an angle other than parallel to each other.

18. The towing hitch assembly of claim 17, wherein the support connector is T-shaped in cross section.

19. The towing hitch assembly of claim 17, wherein the support connector is adapted to provide a plurality of positions to which at least one of the arms may be pivotally connected.

20. The towing hitch assembly of claim 17, wherein the support structure is adapted to provide a plurality of positions to which at least one of the arms may be pivotally connected.

21. The towing hitch assembly of claim 17, wherein at least one of the arms is adapted to provide a plurality of positions by which the arm may be pivotally connected.

22. The towing hitch assembly of claim 17, wherein the support structure comprises a top panel connected to at least two side panels forming a housing, within which at least a portion of the support connector and at least a portion of the arms are housed.

23. The towing hitch assembly of claim 17, wherein the first arm and the second arm angle in towards each other when at rest.

24. The towing hitch assembly of claim 17, wherein the third arm and the fourth arm angle in towards each other when at rest.

25. An apparatus for a towing hitch, comprising:

a connector having a first end and a second end, the connector being releasably and movably attachable to a towing hitch, a first arm pivotally connected to the first end of the connector and pivotally connected to at least one of a towed unit and a towing unit, the first arm forming an angle other than vertical, and a second arm pivotally connected to the second end of the connector and adapted to be pivotally connected to at least one of a towed unit and a towing unit, the second arm forming an angle other than vertical and other than parallel to the angle of the first arm.

* * * * *